United States Patent
Zhang et al.

(10) Patent No.: US 9,792,111 B2
(45) Date of Patent: *Oct. 17, 2017

(54) OBTAINING DEVICE DRIVERS FROM AN OUT-OF-BAND MANAGEMENT NETWORK

(71) Applicant: DELL PRODUCTS, LP, Round Rock, TX (US)

(72) Inventors: Weijia Zhang, Austin, TX (US); Wayne R. Weilnau, Austin, TX (US); Theodore S. Webb, Austin, TX (US); Syama S. Poluri, Round Rock, TX (US); Kevin D. Noreen, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,724

(22) Filed: Dec. 30, 2015

(65) Prior Publication Data

US 2016/0110184 A1 Apr. 21, 2016

Related U.S. Application Data

(63) Continuation of application No. 13/833,871, filed on Mar. 15, 2013, now Pat. No. 9,244,695.

(51) Int. Cl.
*G06F 9/44* (2006.01)
*G06F 9/445* (2006.01)
*H04L 29/08* (2006.01)

(52) U.S. Cl.
CPC ............ *G06F 8/65* (2013.01); *G06F 9/4411* (2013.01); *G06F 9/4413* (2013.01); *G06F 9/44505* (2013.01); *H04L 67/32* (2013.01)

(58) Field of Classification Search
CPC ............ G06F 8/65; G06F 8/68; G06F 11/1433
(Continued)

(56) References Cited

U.S. PATENT DOCUMENTS 6,598,223 B1 7/2003 Vrhel, Jr. et al.
8,225,309 B2 7/2012 Zhang et al.
(Continued)

OTHER PUBLICATIONS

"Lifecycle Controller Remote Services," Dell Embedded Server Management, May 3, 2010.
(Continued)

*Primary Examiner* — Duk Khuong Nguyen
(74) *Attorney, Agent, or Firm* — Larson Newman, LLP

(57) ABSTRACT

A method includes a service processor of an information handling system downloading code, including device drivers, and transferring the code to an operating system of the information handling system without rebooting the operating system. In some embodiments, a daemon of the operating system may request device drivers for newly-inserted devices and the service processor may make the device drivers available to the operating system in response to the requests. In some embodiments, the service processor may download updated device drivers and may inform the daemon. The updated device drivers may be automatically provided to the operating system or made available upon a request of a user. The service processor may make code available to the operating system by exposing a portion of its non-volatile memory to the operating system as a virtual device.

18 Claims, 4 Drawing Sheets

(58) Field of Classification Search
USPC .................................................. 717/168–178
See application file for complete search history.

(56) References Cited

U.S. PATENT DOCUMENTS

| | | |
|---|---|---|
| 8,260,841 B1 | 9/2012 | Maity |
| 8,295,157 B1 | 10/2012 | Pimentel et al. |
| 2003/0195951 A1* | 10/2003 | Wittel, Jr. ............... H04L 67/02 709/220 |
| 2007/0168481 A1* | 7/2007 | Lambert ............... G06F 13/128 709/223 |
| 2007/0168498 A1* | 7/2007 | Lambert ................ H04L 67/38 709/224 |
| 2008/0229301 A1 | 9/2008 | Locker et al. |
| 2009/0307688 A1 | 12/2009 | Pafumi et al. |
| 2011/0254699 A1 | 10/2011 | Sugawara et al. |
| 2011/0296404 A1 | 12/2011 | Zhang et al. |
| 2012/0278796 A1 | 11/2012 | Sandlin et al. |

OTHER PUBLICATIONS

"HP Smart Update Manager (HP SUM)," HP QuickSpecs Overview, DA-14190, V. 1, Nov. 14, 2011.
"Dell iDRAC7 with Lifecycle Controller Feature Guide," Dell OpenManage Systems Management, Rev. 1.0, Mar. 2012.
"Lifecycle Controller Platform Update in Dell PowerEdge 12th Generation Servers," by Sanjeev Nakaya et al., Dell Technical White Paper, Rev. 1.0; Apr. 2012.

* cited by examiner

OBTAINING DEVICE DRIVERS FROM AN OUT-OF-BAND MANAGEMENT NETWORK

CROSS REFERENCE TO RELATED APPLICATIONS

This application is a continuation of U.S. patent application Ser. No. 13/833,871, entitled "Obtaining Device Drivers From an Out-of-Band Management Network," filed on Mar. 15, 2013, the disclosure of which is hereby expressly incorporated by reference in its entirety.

FIELD OF THE DISCLOSURE

This disclosure generally relates to information handling systems, and more particularly relates to obtaining device drivers from an out-of-band management network device drivers.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. The software components may include device drivers, which may require installation or updating.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
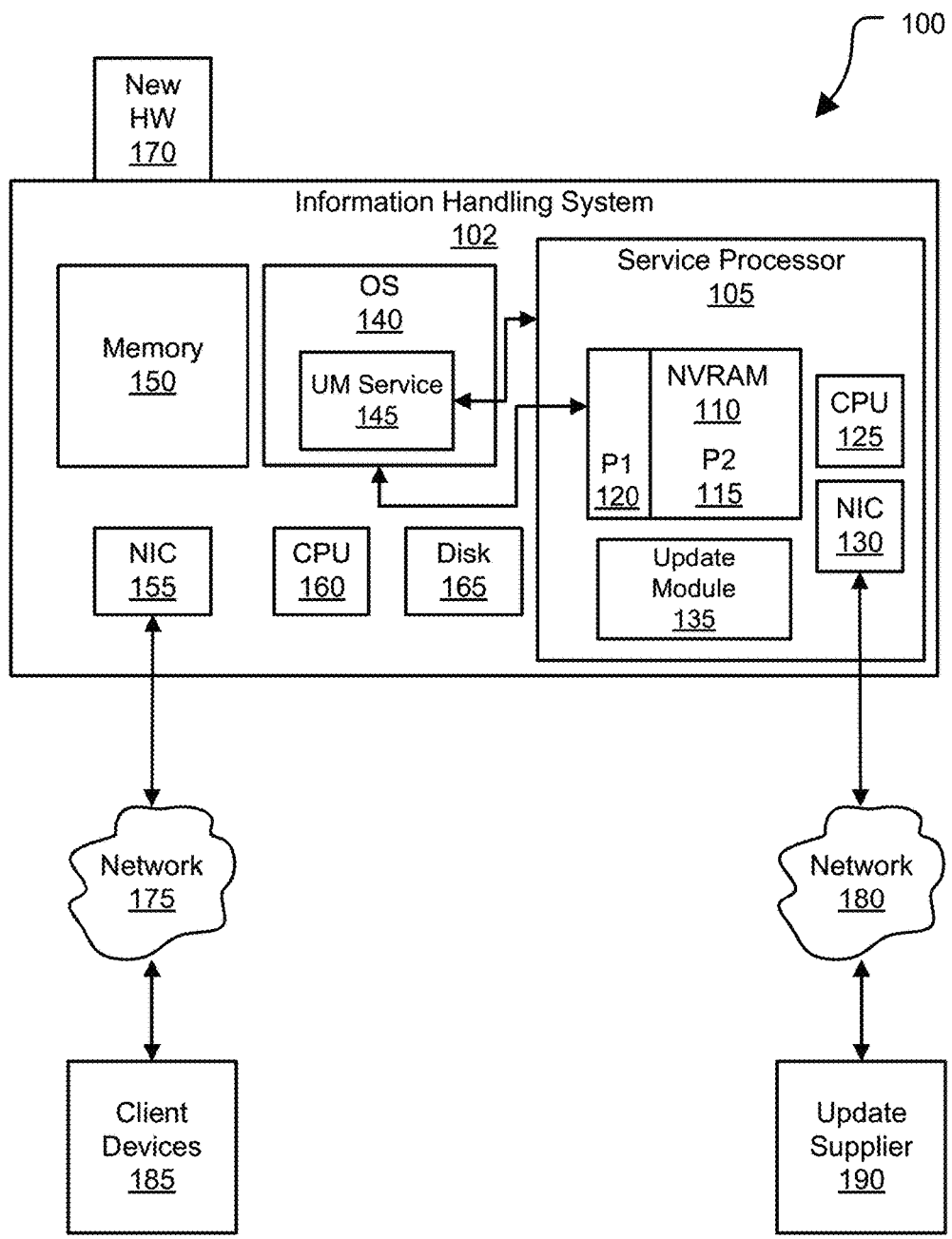
FIG. 1 is block diagram of a system that obtains device drivers from an out-of-band management network, according to one embodiment of the disclosure.

FIG. 1 shows a system 100 for obtaining device drivers from an out-of-band management network that includes information handling system 102, other host network device 185, and update supplier 190. Information handling system 102 is connected to update supplier 190 through network 180, and to other host network device 185 through network 175. In some embodiments, network 180 may comprise a management network and network 175 may comprise a host (in-band) network. In further embodiments, information handling system 102 may be a server. Other host network device 185 may be a client device communicating with information handling system 102 or may be another server of the organization that operates information handling system 102.

Information handling system 102 includes service processor 105, operating system (OS) 140, memory 160, network interface card (NIC) 155, central processing unit (CPU) 160, disk 165, and new hardware 170.

Service processor 105 includes non-volatile random access memory (NVRAM) 110, CPU 125, NIC 130, and update module 135. For purposes of this application, the term NVRAM refers to all non-volatile memory technologies. Service processor 105 may be any system, device, apparatus or component of information handling system 102 configured to permit an administrator or other person to remotely monitor and/or remotely manage information handling system 102 (for example, by an information handling system remotely connected to information handling system 102 via network 180) regardless of whether information handling system 102 is powered on and/or has an operating system installed thereon. In certain embodiments, service processor 105 may allow for out-of-band control of information handling system 102. Out-of-band communications refer to communications that may bypass an operating system. The communications may utilize hardware resources and components that are independent of an operating system. In the embodiment of FIG. 1, network communications to and from service processor 105 are sent through NIC 130 that is physically isolated from the in band communication through network interface card 155. NIC 130 may serve as an interface between service processor 105 and network 180. NIC 130 may enable service processor 105 to communicate over network 180 using any suitable transmission protocol and/or standard.

Thus, for example, if a failure occurs in information handling system 102 that prevents an administrator from remotely accessing information handling system 102 via network 180, such as by operating system failure or power failure, the administrator may still be able to monitor and/or manage information handling system 102 by means of service processor 105. In some cases, the administrator may be able to diagnose problems that have caused failure of information handling system 102. In the same or alternative embodiments, service processor 105 may allow an administrator to remotely manage one or more parameters associated with operation of information handling system 102 such as power usage, processor allocation, memory allocation, or security privileges. In certain embodiments, service processor 105 may include or may be a Baseboard Management Controller (BMC), a Management Engine (ME), an integral part of a Dell Remote Access Controller (DRAC), or an Integrated Dell Remote Access Controller (iDRAC), which are systems management hardware and software solutions operable to provide remote management capabilities.

NVRAM is separated into partitions 115 and 120. Service processor 105 may expose one or more partitions to OS 140. CPU 125 may be communicatively coupled to NVRAM 110, NIC 130, and update module 135. CPU 125 may also be electrically coupled to a power source dedicated to the service processor 105. CPU 125 may include any system, device, or apparatus configured to interpret and/or execute program instructions and/or process data, and may include, without limitation a microprocessor, microcontroller, DSP, ASIC, or any other digital or analog circuitry configured to interpret and/or execute program instructions and/or process data. In some embodiments, CPU 125 may interpret and/or execute program instructions and/or process data stored in NVRAM 110, update module 135, and/or another component of service processor 105.

Update module 135 may obtain code for use on information handling system 102. For purposes of this disclosure, code includes software, firmware, and other forms of computer programs. Update module 135 may make the code available to information handling system 102. The code may be updates of previously installed code or may be for initial installation. Some of the code may be downloaded from update supplier 190 over network 180. Update module 135 may constitute an advanced embedded system management tool for automated updates of system code, code inventory, code rollback (restoration of code to a previous version), and code correction. Update module 135 may reside in non-volatile memory, such as in NVRAM 110, may be started during a boot sequence, and may function in a pre-operating system environment. In some embodiments, update supplier 190 may be part of a cloud-computing facility. Cloud computing may refer to the access of computing resources and data via a network infrastructure, such as the Internet. The computing resources and data storage may be provided by linked data centers of the network infrastructure. In many embodiments, cloud computing resources are provided on demand to customers. As a result, the customers may have access to needed computer resources without having to purchase equipment or construct data centers.

In other embodiments, service processor 105 may include additional components or may omit some of the components illustrated in FIG. 1. For example, in other embodiments, memory of a service processor may include any other system, device, or apparatus configured to retain program instructions and/or data for a period of time, such as computer-readable media. By way of example without limitation, the memory may include RAM, EEPROM, a PCMCIA card, flash memory, magnetic storage, opto-magnetic storage, or any suitable selection and/or array of volatile or non-volatile memory that retains data after power to information handling system 102 is turned off or power to service processor 105 is removed. In some embodiments, service processor 105 may contain both volatile and non-volatile memory.

Operating system 140 includes update manager service 145. Update manager service 145 is a service or daemon, a computer program that runs as a background process. Daemons may be started at boot time and may respond to network requests, hardware activity, or other programs by performing some task. Daemons may also configure hardware and run scheduled tasks. Update manager service 145 may be created by an operating system vendor or may be installed during the manufacture of information handling system 102.

In the embodiment of FIG. 1, update manager service 145 communicates with service processor 105 about code, such as device drivers. A device driver may constitute software that acts as an interface between hardware and operating system 140 or another higher-level program. The device driver may communicate with the hardware over a communications bus. It may receive calls from the higher-level program and issue commands to the hardware in response to the commands.

Update manager service 145 may, for example, constantly scan for deployment of new hardware, such as new hardware 170. If it detects new hardware, it may send a message to service processor 105 to provide device drivers needed for the new hardware. The messages may be sent under a standard management protocol, such as Intelligent Platform Management Interface (IPMI) or WS-Management (WS-Man). Similarly, update manager service 145 may receive messages from service processor 105 of the availability of code for use by operating system 140, such as the availability of device drivers for newly-installed hardware or updated device drivers and may inform operating system 140.

In some embodiments, service processor 105 may expose the drivers to OS 140 as local media; that is, service processor 105 may make a portion of its memory, such as a folder of memory of 110 NVRAM, accessible to operating system 140. The portion of memory may appear to operating system 140 as local media, such as a universal serial bus (USB) device; for example, a Compact Disc Read-only memory (CDROM), a flash drive, or any other USB storage device. In many embodiments, a service processor may emulate devices other than USB devices to make a device driver available to an operating system. The service processor may, for example, emulate a Peripheral Component Interconnect Express (PCIe) storage device or communications device, a non-PCIe communications device, or an HID device. In other embodiments, service processor 105 may make the drivers available to OS 140 through the use of a shared memory or may communicate through use of the Intelligent Platform Management Interface (IPMI) and shared memory.

This portion of memory that appears to operating system 140 as an actual device will be referred to as a virtual device. Service processor 105 may, for example, store the drivers on a partition of NVRAM 110, such as P1 120, and may make the contents of the partition available to operating system 140 as a USB device.

After the virtual devices are exposed, operating system 140 may read the desired drivers from P1 120 or another partition of NVRAM 110 memory and may install them. Afterwards, service processor 105 may halt the exposure of the drivers when the deployment is done. The exposure may be for a fixed period, or service processor 105 may receive a message from update manager service 145 that the drivers have been read from storage. In many embodiments, operating system 140 may obtain the device drivers while engaged in normal operations; that is, without needing to shut down, restart, or reboot.

Embodiments of system 100 may enable the retrieval of device drivers and other code from an out-of-band management network. When a service processor is connected to a supplier of device driver updates, such as in a cloud computing facility through the out-of-band management network, the service processor may automatically download updated drivers and drivers for new equipment or other code. An update manager service may detect the downloading of the device drivers or other code and inform an operating system of their availability. It may then request that the service processor make the code available. The operating system may read the code while continuing to operate, without needing to shut down and reboot. This method of retrieval may provide an efficient and secure method of installation of device drivers.

In contrast, methods by which operating systems directly obtain device drivers may be less efficient or secure. Some operating systems may not be Internet connected. In that case, obtaining the drivers requires obtaining physical storage media and inserting the media in a computing device. In other cases, the in-band networks may be burdened with regular network traffic, or the networks may not offer sufficient security. In FIG. 1, for example, network 175 may offer general access to potential customers of a business, while access to network 180 may be limited to trusted suppliers of the business. Accordingly, network 180 may provide more security than network 175 for downloaded information. Further, because of resource constraints, the operating systems may have limited ability to monitor for updated device drivers.

In other embodiments, communications between an operating system and a service processor may involve methods other than a daemon or service. The service processor may, for example, send a message to a module of the operating system. In other embodiments, a service processor may make the retrieved code available by methods other than by making a virtual device available to the operating system. In some embodiments, a system may make use of a network share to enable communications between a service processor and an operating system for transmitting a device driver. In a few embodiments, a device driver may enable communications between a service processor and an operating system.

Figure 2:
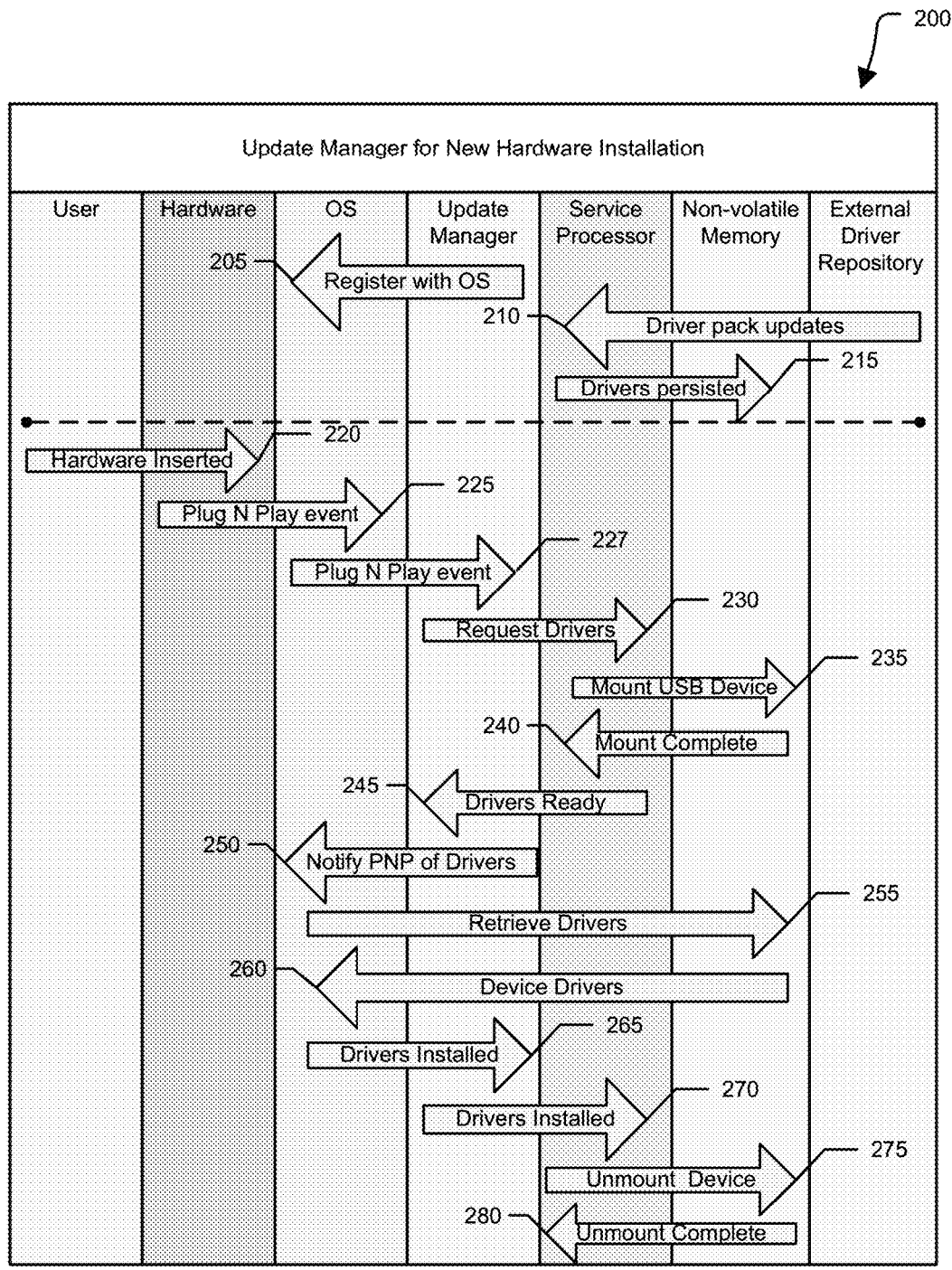
FIG. 2 is a flow diagram illustrating a method of installing a device driver for new hardware, according to one embodiment of the disclosure.

FIG. 2 is flow diagram 200 of a method that begins at block 205 with an update manager of an information handling system, such as update manager service 145 of FIG. 1, registering for notification of the connection of a new hardware device, such as registration for the connection of a Plug and Play device. When such a device is connected to the information handling system, the operating system may automatically detect the device and attempt to install the proper device drivers. The registration may consist of the update manager service, at system startup, requesting an operating system to notify it when new Plug and Play devices are attached to the information handling system.

A service processor, such as service processor 105 of FIG. 1, may receive driver pack updates from an external driver repository, such as update supplier 190 of FIG. 1, at block 210. In some embodiments, the updates may be sent in packages. The updates may be sent without a specific request from the service processor for updates, such as periodically or whenever the external driver repository determines that sending out an update might be useful. At block 215, the service processor stores the driver package in non-volatile memory, such as NVRAM 110 of FIG. 1.

At block 220, a new device is inserted and detected by an operating system at block 225. The detection may start a Plug and Play event, the automatic detection by an operating system of the insertion of a new device into a computer, the loading of appropriate device drivers, and the configuration of the device properties and settings. If the device drivers are not currently available to the operating system, the insertion of the device may require the operating system to locate appropriate device drivers.

When the new device is inserted, the update manager is notified of the device insertion at block 227. The notification may be a result of the update manager's registration with the operating system. At block 230, the update manager sends a command to the service processor requesting that it provide the necessary device drivers for the newly-added device.

At block 235, the service processor may comply with the request by exposing a USB device that contains the device drivers to support the device on the operating system currently running. The exposed USB device may be a virtual device, consisting of a portion of non-volatile memory that is made available to the operating system under the protocols for communicating with USB devices. The service processor monitors the completion of the mounting or exposure of the USB device at block 240 and informs the update manager when the drivers are available at block 245.

Once the update manager has determined that the USB device has been exposed to the operating system, it then informs the operating system of the location of the device drivers at block 250. It may, for example, identify the virtual device and provide a location of a file within the virtual device. The operating system then retrieves the device drivers from the storage at block 255 and installs them at block 260. The update manager monitors the device driver installation process and determines at block 265 that the drivers are installed. When the installation is complete, the update manager sends a request to the service processor to unmount the USB device at block 270. The service processor then unmounts the device at block 275 and verifies that the unmount operation is complete at block 280.

In some embodiments, drivers may not be available by the procedure described in blocks 230 through 270. The necessary drivers may not have been downloaded by the service processor or there may have been a communications failure between the operating system and the service processor. In that case, there may be back-up procedures for obtaining the drivers. The operating system may, for example, try to locate the driver itself, in local storage or over an in-band network. If these attempts also fail, the device manager of the operating system may issue a failure message. The failure message may inform the user that the operating system was unable to find a suitable device driver and request that the user provide a driver. In some embodiments, the operating system may find drivers in addition to those supplied by the service processor. In those cases, there may be a tie-breaking procedure. The operating system may select the most recent driver or a driver that is signed by a more trusted entity.

In other embodiments, different mechanisms for requesting drivers from a service processor may be implemented. The service processor may search for the drivers over a network pursuant to a request from the operating system, rather than searching through already-downloaded drivers for a suitable driver. In addition, the device driver may be sent from the service processor to the operating system by means other than exposing a USB device.

Figure 3:
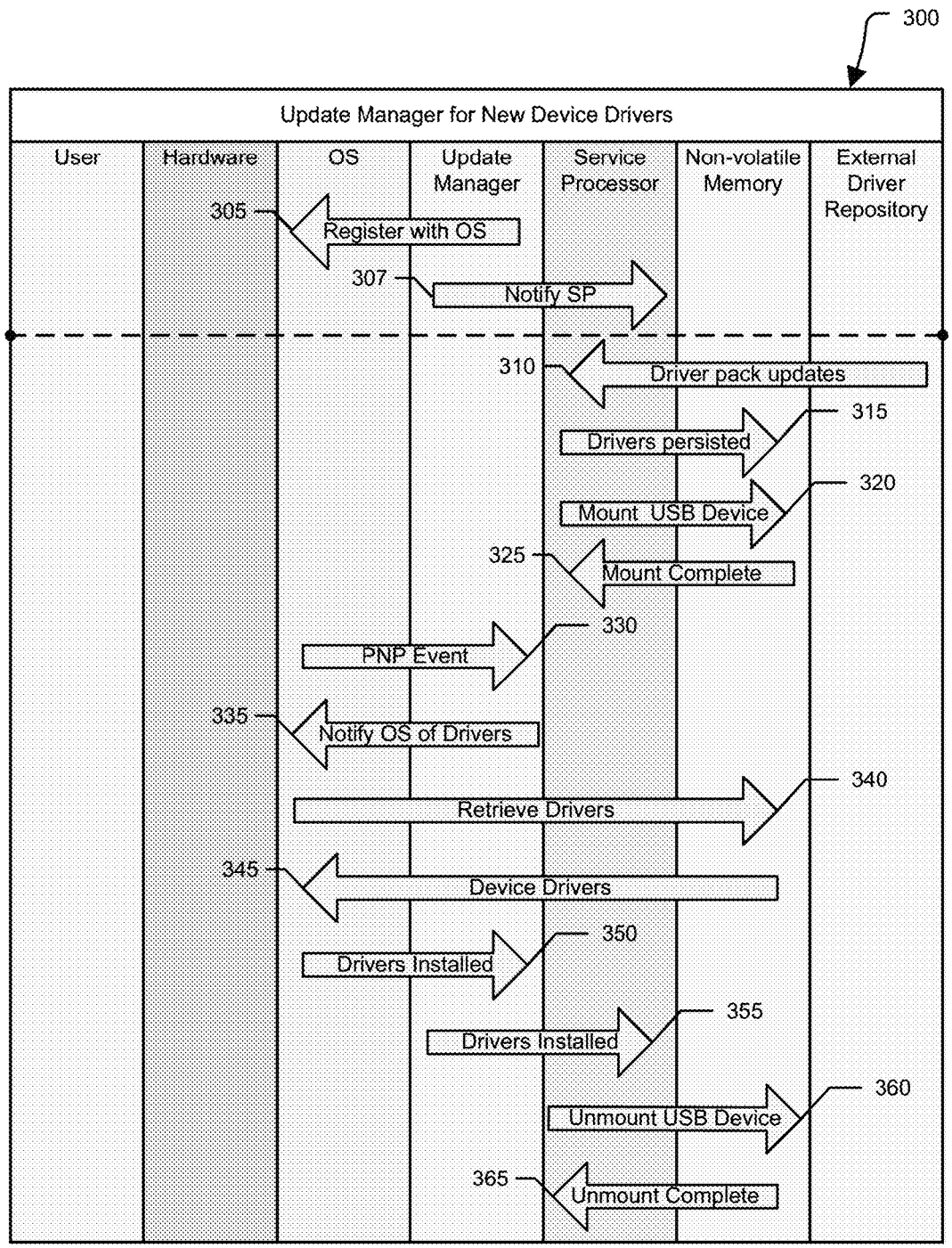
FIG. 3 is a flow diagram illustrating a method of updating a device driver for hardware, according to one embodiment of the disclosure.

FIG. 3 is flow diagram 300 of a method that begins at block 305 with an update manager of an information handling system, such as update manager service 145 of FIG. 1, registering for notification of the insertion of a new device, such as Plug and Play registration. The registration may consist of the update manager service, at system startup, requesting an operating system to notify it of the insertion of new Plug and Play devices. At block 307, the update manager sends notification to a service processor, such as service processor 105 of FIG. 1, that it is running within the operating system and specifies the operating system in use. In FIG. 3, the flows of blocks 305 and 307 may be for initialization, while the subsequent flows may be in response to plug-and-play events.

The service processor, such as service processor 105 of FIG. 1, may receive driver pack updates from an external driver repository, such as update supplier 190 of FIG. 1, at block 310. In some embodiments, the updates may be sent in packages. The updates may be sent without a specific request from the service processor for updates, such as periodically or whenever the external driver repository determines that sending out an update might be useful. At block 315, the service processor stores the driver package in non-volatile memory, such as NVRAM 110 of FIG. 1.

At block 320, the service processor exposes a USB device that contains the updated device drivers. The device may be a virtual device, consisting of a portion of non-volatile memory that is made available to the operating system under the protocols for communicating with USB devices. To the operating system, it may appear that a USB device has been mounted on the information handling system. The exposure of the USB device may be automatic or user initiated. If the exposure is automatic, the USB device may be exposed to the operating system shortly after receipt of updated device drivers. If the exposure is user initiated, the service processor may delay exposing the USB device to the operating system until it receives approval from the user. The service processor may inform the user of the version of device drivers installed on the information handling system and the versions present in the update package and may ask the user if the user wants to update the old versions. In some embodiments, a graphical user interface (GUI) of the service processor may enable a user to configure a policy about device driver updates, such as whether the updates are automatic or user-initiated.

The service processor monitors the completion of the mounting or exposure of the USB device, at block 325. At block 330, the operating system detects that the USB device is attached to the information handling system and informs the update manager. In the embodiment of FIG. 3, the mounting of the USB device constitutes a plug-and-play event.

At block 335, the update manager detects that the new USB device contains updated device drivers and notifies the operating system of the availability of the device drivers. The update manager may, for example, provide a location of a file within the virtual device. The operating system then retrieves the device drivers from the storage at block 340 and installs them at block 345. In some embodiments, the operating system selects the device drivers to install. In other embodiments, the update manager informs the operating system of the appropriate device drivers. The update manager monitors the device driver installation process and determines at block 350 that the drivers are installed. When the installation is complete, the update manager notifies the service processor at block 355. The service processor then unmounts the device, at block 360 and verifies that the unmount operation is complete at block 365.

In some embodiments, the operating system may find updated drivers in addition to those supplied by the service processor. In those cases, there may be a tie-breaking procedure. The operating system may select the most recent driver or a driver that is signed by a more trusted entity.

Figure 4:
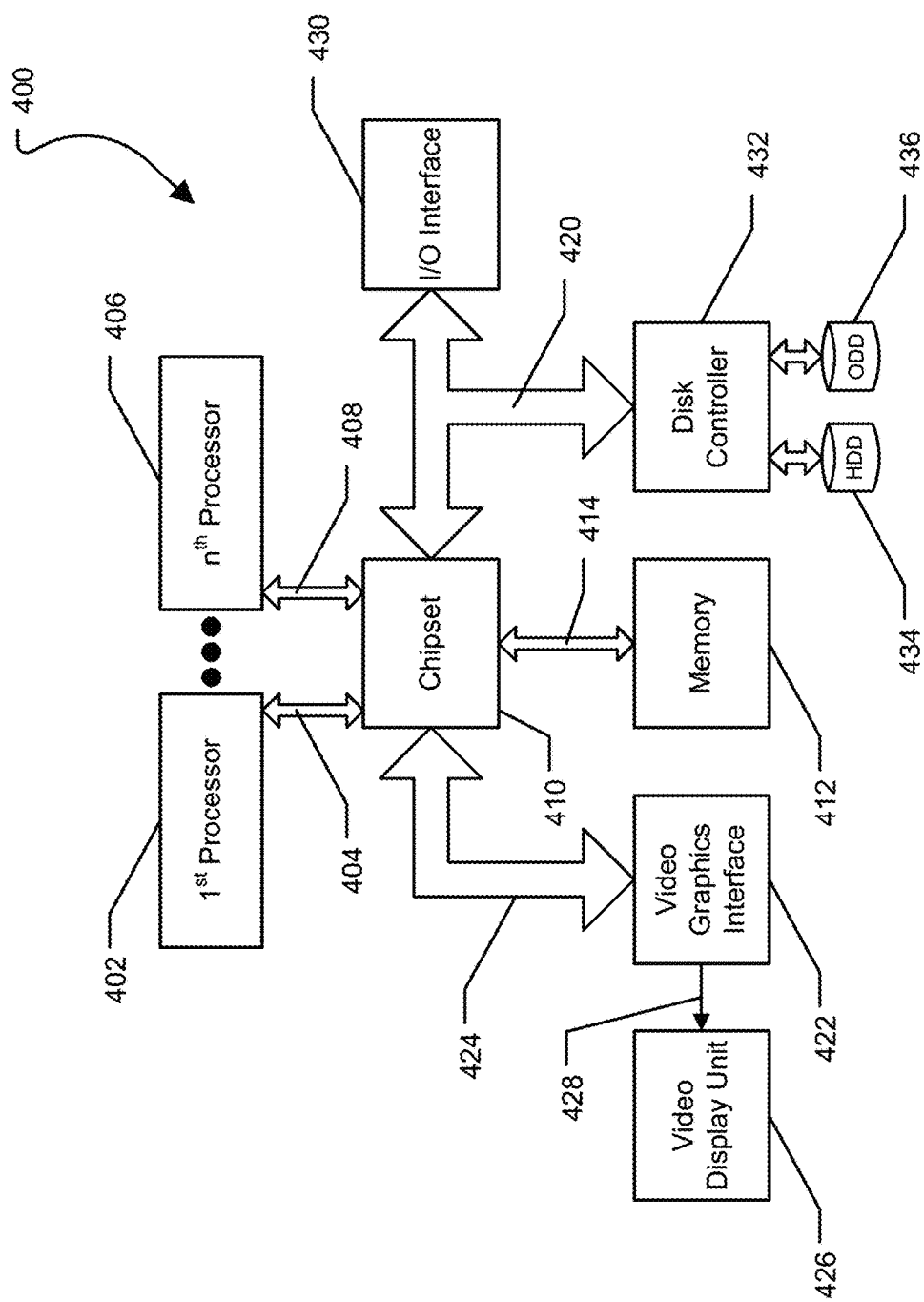
FIG. 4 illustrates a block diagram of an information handling system according to one embodiment of the disclosure.

FIG. 4 illustrates a block diagram of an exemplary embodiment of an information handling system, generally designated at 400. In one form, the information handling system 400 can include information handling system 102 or update supplier 190 of FIG. 1 or can carry out portions of the methods of FIGS. 2 and 3. The information handling system 400 can include a first physical processor 402 coupled to a first host bus 404 and can further include additional processors generally designated as $n^{th}$ physical processor 406 coupled to a second host bus 408. The first physical processor 402 can be coupled to a chipset 410 via the first host bus 404. Further, the $n^{th}$ physical processor 406 can be coupled to the chipset 410 via the second host bus 408. The chipset 410 can support multiple processors and can allow for simultaneous processing of multiple processors and support the exchange of information within information handling system 400 during multiple processing operations.

According to one aspect, the chipset 410 can be referred to as a memory hub or a memory controller. For example, the chipset 410 can include an Accelerated Hub Architecture (AHA) that uses a dedicated bus to transfer data between first physical processor 402 and the $n^{th}$ physical processor 406. For example, the chipset 410, including an AHA enabled-chipset, can include a memory controller hub and an input/output (I/O) controller hub. As a memory controller hub, the chipset 410 can function to provide access to first physical processor 402 using first bus 404 and $n^{th}$ physical processor 406 using the second host bus 408. The chipset 410 can also provide a memory interface for accessing memory 412 using a memory bus 414. In a particular embodiment, the buses 404, 408, and 414 can be individual buses or part of the same bus. The chipset 410 can also provide bus control and can handle transfers between the buses 404, 408, and 414.

According to another aspect, the chipset 410 can be generally considered an application specific chipset that provides connectivity to various buses, and integrates other system functions. For example, the chipset 410 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 410. The chipset 410 can also be packaged as an application specific integrated circuit (ASIC).

The information handling system 400 can also include a video graphics interface 422 that can be coupled to the chipset 410 using a third host bus 424. In one form, the video graphics interface 422 can be a Peripheral Component Interconnect (PCI) Express interface to display content within a video display unit 426. Other graphics interfaces may also be used. The video graphics interface 422 can provide a video display output 428 to the video display unit 426. The video display unit 426 can include one or more types of video displays such as a flat panel display (FPD) or other type of display device.

The information handling system 400 can also include an I/O interface 430 that can be connected via an I/O bus 420 to the chipset 410. The I/O interface 430 and I/O bus 420 can include industry standard buses or proprietary buses and respective interfaces or controllers. For example, the I/O bus 420 can also include a PCI bus or a high speed PCI-Express bus. PCI buses and PCI-Express buses can be provided to comply with industry standards for connecting and communicating between various PCI-enabled hardware devices. Other buses can also be provided in association with, or independent of, the I/O bus 420 including, but not limited to, industry standard buses or proprietary buses, such as Industry Standard Architecture (ISA), Small Computer Serial Interface (SCSI), Inter-Integrated Circuit (I$^2$C), System Packet Interface (SPI), or Universal Serial buses (USBs).

In an alternate embodiment, the chipset 410 can be a chipset employing a Northbridge/Southbridge chipset configuration (not illustrated). For example, a Northbridge portion of the chipset 410 can communicate with the first physical processor 402 and can control interaction with the memory 412, the I/O bus 420 that can be operable as a PCI bus, and activities for the video graphics interface 422. The Northbridge portion can also communicate with the first physical processor 402 using first bus 404 and the second bus 408 coupled to the n$^{th}$ physical processor 406. The chipset 410 can also include a Southbridge portion (not illustrated) of the chipset 410 and can handle I/O functions of the chipset 410. The Southbridge portion can manage the basic forms of I/O such as Universal Serial Bus (USB), serial I/O, audio outputs, Integrated Drive Electronics (IDE), and ISA I/O for the information handling system 400.

The information handling system 400 can further include a disk controller 432 coupled to the I/O bus 420, and connecting one or more internal disk drives such as a hard disk drive (HDD) 434 and an optical disk drive (ODD) 436 such as a Read/Write Compact Disk (R/W CD), a Read/Write Digital Video Disk (R/W DVD), a Read/Write mini-Digital Video Disk (R/W mini-DVD), or other type of optical disk drive.

The disk drive units 434 and 436 may include a computer-readable medium in which one or more sets of instructions such as software can be embedded. Further, the instructions may embody one or more of the methods or logic as described herein. In a particular embodiment, the instructions may reside completely, or at least partially, within memory 414 and/or within one or more of processors 402 and 406 during execution by the information handling system 400. Memory 414 and processors 402 and 406 also may include computer-readable media.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via a network interface device.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
  a service processor including:
    an out-of-band network interface to download code updates, wherein code download bypasses an operating system of the information handling system;
    a processor;
    a network interface card; and
    a memory to store the downloaded code updates, the service processor to communicate with a daemon of an operating system of the information handling system concerning the downloaded code updates, wherein the service processor is a component of the information handling system configured to remotely monitor or manage the information handling system; and
  the operating system to receive the downloaded code updates from the service processor without rebooting, the operating system including the daemon to communicate with the service processor about code updates, wherein:
    the operating system is to notify the daemon of the insertion of new devices on the information handling system;

the daemon is to send a request to the service processor for device drivers for the new devices in response to the notification;

the service processor is to inform the daemon of the receipt of updated device drivers; and the service processor is to provide the requested device drivers to the operating system in response to the requests, wherein the requested device drivers are included in the downloaded code updates.

2. The information handling system of claim 1 wherein:
the memory comprises non-volatile memory; and
the service processor is to expose a portion of the non-volatile memory to the operating system as a virtual device in response to the requests, the portion containing the requested device drivers.

3. The information handling system of claim 2 wherein the virtual device appears to the operating system as a universal serial bus (USB) device or a Peripheral Component Interconnect Express (PCIe) device.

4. The information handling system of claim 1 wherein the operating system is to receive the downloaded code updates from the service processor through the use of the Intelligent Platform Management Interface (IPMI) and shared memory.

5. The information handling system of claim 1 wherein:
the memory comprises non-volatile memory;
the service processor is to expose a portion of the non-volatile memory to the operating system as a virtual device, the portion containing the updated device drivers; and
the daemon is to monitor the exposing and to inform the operating system when the virtual device can be read by the operating system.

6. The information handling system of claim 5 wherein:
the daemon is to register with the operating system for notification of the connection of new hardware devices;
in response to a connection of a new hardware device to the information handling system, the operating system is to automatically detect the new hardware device and to attempt to install device drivers for the new hardware device;
the notification of the daemon by the operating system of the insertion of new devices on the information handling system is as a result of the registration;
the operation system is to retrieve and install the requested device drivers; and
the daemon is to notify the service processor when the installation of the requested device drivers is complete.

7. The information handling system of claim 5 wherein:
the daemon is to register with the operating system for notification of the connection of new hardware devices;
the daemon is to notify the service processor that it is running within the operating system and to specify the operating system in use;
the service processor is to download a device driver of the updated device drivers, wherein the updated device driver was not requested by the daemon;
the service processor is to store the updated device driver in the non-volatile memory; and
the service processor is to expose a portion of the non-volatile memory to the operating system as a virtual device, the portion containing the updated device driver.

8. A method comprising:
downloading code by a service processor of an information handling system over an out-of-band network, wherein the service processor is a component of the information handling system configured to remotely monitor or manage the information handling system, the service processor includes a processor and a network interface card, and the out-of-band network bypasses an operating system of the information handling system;

informing the operating system of the information handling system of the downloading of the code;

transferring the code from the service processor to the operating system without shutting down and restarting the operating system;

detecting by a daemon of the operating system the insertion of a new device in the information handling system;

sending by the daemon to the service processor a request that the service processor transfer a device driver for the new device to the operating system;

informing by the service processor the daemon of the receipt of updated device drivers; and transferring the device driver from the service processor to the operating system in response to the request, wherein the device driver is included in the downloaded code.

9. The method of claim 8 wherein:
the inserting comprises inserting a plug-and-play device; and
the detecting comprises registering by the daemon for notification of the insertion of plug-and-play devices and receiving by the daemon from the operating system notification of the insertion of a plug-and-play device.

10. The method of claim 8 wherein:
the downloading comprises downloading updated device drivers;
the informing comprises informing a daemon of the operating system of the downloading of the updated device drivers; and
the transferring comprises the service processor storing the updated device drivers in non-volatile memory of the service processor and exposing the non-volatile memory service processor to the daemon as a virtual device.

11. The method of claim 10 wherein the transferring comprises automatically transferring the updated device drivers.

12. The method of claim 10 wherein the transferring comprises:
informing a user of the information handling system of the downloading of the updated device drivers;
receiving from the user a request to install one or more of the updated device drivers; and
installing the one or more of the updated device drivers in response to the request from the user.

13. The method of claim 12 wherein the informing comprises providing to the user of the information handling system of version information about the updated device drivers and version information about the current device drivers.

14. The method of claim 8 wherein:
the downloading comprises downloading updated device drivers; and
the method further comprises downloading updated device drivers over an in-band network.

15. The method of claim 14 further comprising selecting between installing a first device driver for a device and installing a second device driver for the device, wherein:
the first device driver is containing in the device drivers downloaded over the in-band network;

the second device driver is contained in the device drivers downloaded by the service processor; and the selection of a device driver is based upon a one or more of a date of the device driver and a degree of trust in a supplier of the device driver.

16. The method of claim 8 wherein the downloading comprises downloading the code while the operating system is running.

17. A method comprising:

downloading a device driver by a service processor of an information handling system over an out-of-band network, wherein:

the service processor is a component of the information handling system configured to remotely monitor or manage the information handling system, the service processor includes a processor and a network interface card, and the out-of-band network bypasses an operating system of the information handling system; and the device driver includes software that acts as an interface between hardware and the operating system or another higher-level program of the information handling system, receives calls from the operating system or the other higher-level program of the information handling system, and issues commands to the hardware in response to the calls; and communicating between the service processor and a daemon of the operating system of the information handling system while the operating system is running, the communicating comprising:

the service processor informing the daemon of the downloading of the device driver;

the operating system requesting the device driver from the service processor; and transferring the device driver from the service processor to the operating system.

18. The method of claim 17 wherein:

the communicating comprises:

the daemon requesting the device driver from the service processor for a newly inserted device; and the service processor notifying the daemon of the downloading of the device driver; and the service processor transferring the device driver to the operating system comprises:

the service processor storing the device driver in non-volatile memory of the service processor; and exposing the non-volatile memory to the daemon as a virtual device.

* * * * *